United States Patent [19]

Grimm

[11] Patent Number: 4,905,805
[45] Date of Patent: Mar. 6, 1990

[54] TORQUE LIMITING CLUTCH WITH BY-PASS

[75] Inventor: Duane H. Grimm, Rockford, Ill.

[73] Assignee: Sundstrand Corporation, Rockford, Ill.

[21] Appl. No.: 199,793

[22] Filed: May 27, 1988

[51] Int. Cl.⁴ ............... F16D 47/00; F16D 27/00
[52] U.S. Cl. .................. 192/48.3; 192/48.2; 192/56 R; 192/84 PM
[58] Field of Search ............ 192/48.2, 48.5, 48.3, 192/56 R, 84 PM

[56] References Cited

U.S. PATENT DOCUMENTS 2,065,244 11/1936 Richards ..................... 192/56 R
2,711,549 6/1955 Hirvonen ..................... 192/48.5
3,063,529 11/1962 Cook ........................... 192/48.5

FOREIGN PATENT DOCUMENTS 1020242 11/1957 Fed. Rep. of Germany ..... 192/48.2

Primary Examiner—Leslie A. Braun
Assistant Examiner—Andrea Pitts
Attorney, Agent, or Firm—Antonelli, Terry & Wands

[57] ABSTRACT

A coupling providing protection against excessive torque transmission with an override capability. The torque limiting clutch capable of overrun without detrimental thermal or mechanical effects is capable of being by-passed by a lock-up clutch which torsionally connects the input and output of the torque limiting clutch. The lock-up clutch is actuated by an external command.

15 Claims, 3 Drawing Sheets

TORQUE LIMITING CLUTCH WITH BY-PASS

DESCRIPTION

1. Technical Field

This invention relates to a torque limiting clutch to prevent excessive loading which has an override feature to by-pass the torque limiting clutch.

2. Background Art

Aircraft actuation systems typically require torque protection to avoid excessive loading in the event of a system jam. Multiple loads are frequently powered by the same motor and torque is supplied by shaft rotation. A jam or other condition which stops one shaft in such system must not impede operation of other shafts. Moreover, an override to apply an unlimited torque transfer capability has been found desirable in certain operation conditions.

DISCLOSURE OF THE INVENTION

It is an object of the present invention to provide a novel system which includes a torque limiting clutch with a selectively operable by-pass arrangement to allow unlimited torque transfer capability.

Another object is to provide a novel mechanism where basic torque protection is provided with a torque limiting clutch that establishes a maximum threshold of transmitted torque and concomitantly a full torque transfer capacity is readily available. The torque limiting clutch advantageously can withstand overrun without detrimental thermal or mechanical effects. When torque protection is not desired, a lock-up clutch is used to connect the input and output of the torque protection device. A lock-up clutch may be actuated by an external command in response to control signals indicating operating conditions require torque protection to be by-passed.

These and other objects of the invention will become more fully apparent from the claims and from the description as it proceeds in conjunction with the appended drawings.

BEST MODE FOR CARRYING OUT THE INVENTION

Figure 1:
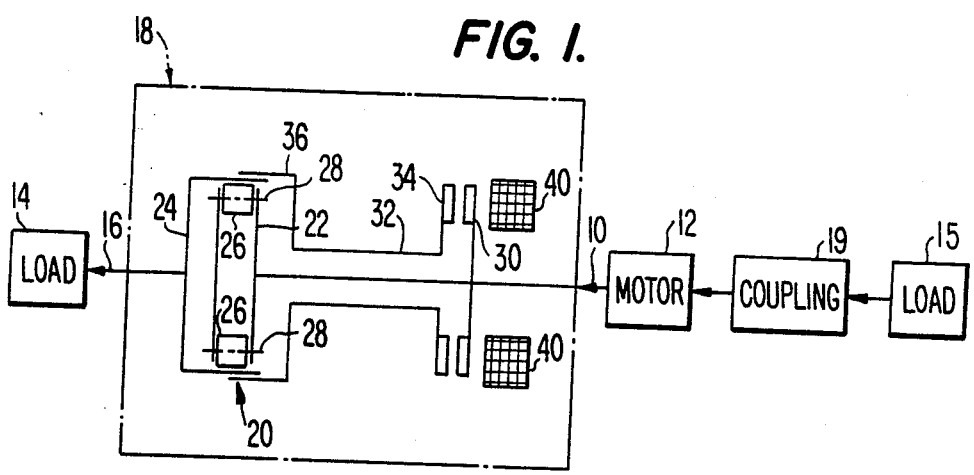
FIG. 1 is a schematic diagram of a system embodying the present invention.

Referring to FIG. 1, the reference numeral 10 designates an input shaft which receives torque from any suitable type of motor 12. Load 14 is connected to an output shaft 16 which is driven by a coupling 18 that has two torque transmission paths. One or more supplemental loads 15 may be driven by motor 12 through respective coupling(s) 19.

One transmission path is through a torque limiting clutch 20 that has an input member 22 which is connected to shaft 10 and an output member 24 which is connected to shaft 16.

One suitable type of torque limiting clutch that can be overrun without detrimental thermal or mechanical effects has rollers 26 that have axles 28 secured to turn with the input member 22. Output member 24 has an interior surface 25 shown in FIG. 2 against which the rollers 26 abut. Rollers 26 are urged outwardly by a compression spring 27. The interior surface 25 of output member 24 has an elliptical or oval shape with its major axis as illustrated in FIG. 2 being in a vertical direction and its minor or smallest axis perpendicular thereto.

Figure 2:
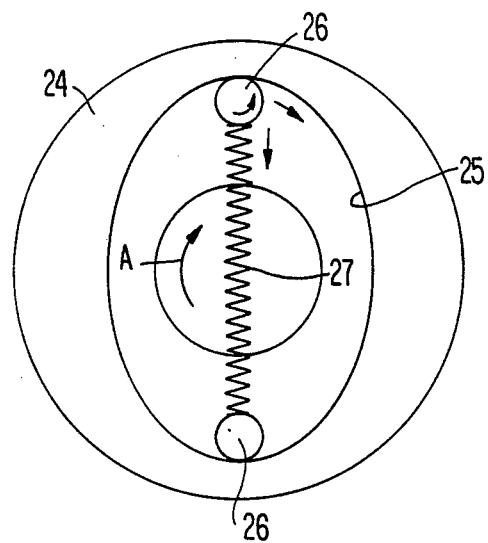
FIG. 2 is an end view of the outer member of a roller cam clutch in the system of FIG. 1.

When axles 28 of rollers 26 are driven by the input shaft 10 clockwise as illustrated by the arrow A in FIG. 2, the rollers 26 move clockwise toward the minor or smallest diameter as the load on output shaft 16 increases, thereby displacing rollers 26 inwardly toward the rotational axis of the drive shaft 10 against the bias of the spring 27. Maximum torque transmission is limited by the choice of the spring constant and the slope between the largest and smallest diameters of the elliptical surface 25. The oval shape can be asymmetrical where the torque is to be limited to a greater extent for rotation in one direction than the other.

A second torque transmission path is a by-pass or override feature where a ring gear 30 having dog teeth is connected to the input member 22 to be driven by input shaft 10. A transfer member 32 also has a ring gear 34 with similar teeth that are normally spaced from and out of engagement with the teeth on ring gear 30 to form a jaw clutch. Transfer member 32 may be provided with an output splined portion which is slidably received on a splined outer surface of output member 24. Transfer member 32 thus is mounted for rotation at all times with the output member 24.

Electromagnets 40 are provided to attract ring 34 so that the transfer member 32 can be axially moved toward ring gear 30 and cause the clutch teeth on the gears 30 and 34 to become engaged. Energization of the electro-magnets 40 allows the torque limiting drive path to be by-passed and provides a torque transfer capability through the jaw clutch which is not limited by the torque protection threshold.

The coupling may be made bi-directional and by using a asymmetrical oval, can have different threshold values for the two different directions of rotation. Where it is desired to drive a second load 15 from the same motor 12 as illustrated in FIG. 1, use of a second coupling 19 having its own torque limiting clutch and a by-pass may be useful for certain applications.

Upon de-energization of the electromagnets 40, transfer member 32 returns to its illustrated position under the influence of a biasing spring (not shown in FIG. 1) to provide again the torque limiting mode of operation. During the torque limiting mode of operation, sustained rotation of input shaft 10 is possible even in the event the output load abruptly increases such as may occur in the event of a jam in a gear train, reaching a stop position or for other reasons. Thus, the override feature of the present invention allows by-passing of the torque protection, regardless of direction of rotation, which is a desirable feature in certain applications.

Figure 3:
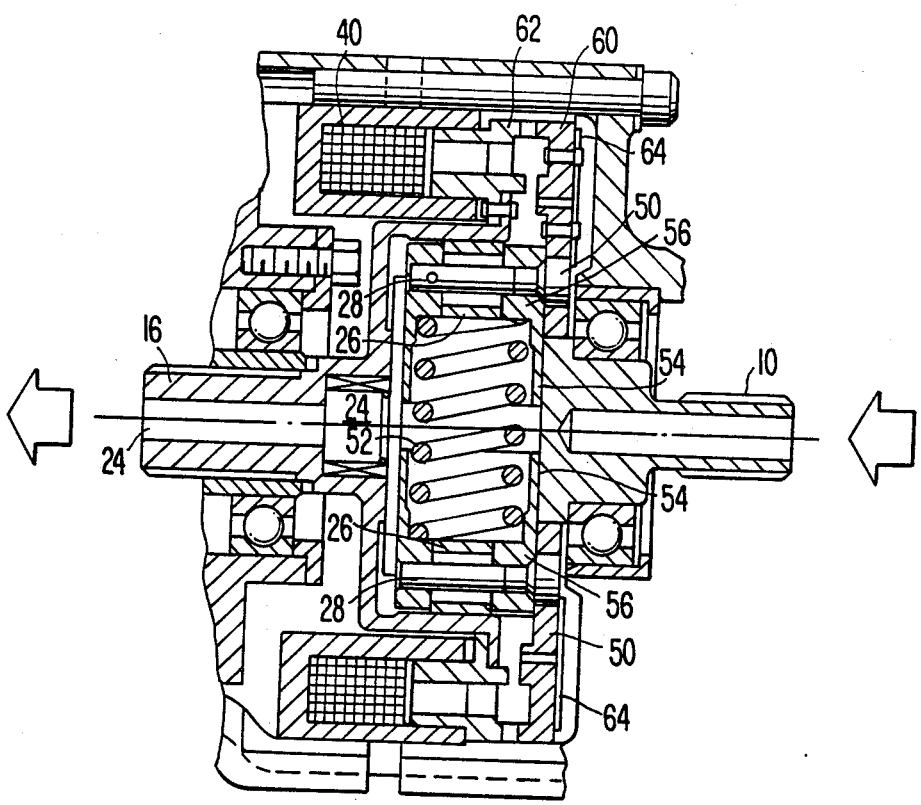
FIG. 3 is an elevation in section of a structure embodying the system depicted in FIG. 1.

Turning now to FIG. 3, an assembly is shown where functionally similar parts have the same reference numerals as are used in the description of FIG. 1. The input shaft 10 drives an end plate 50 which in turn drives axles 28 and their rollers 26. The output member 24 has an oval surface along which rollers 26 are adapted to move while compressing spring 52 which is held in place by a pair of cylindrical members 54 having end wall portions 56.

The ring 60 that is carried at the periphery of end plate 50 carries clutch teeth that are engagable with the corresponding teeth on ring 62. Ring 62 is mounted for rotational movement with output member 24. The ring 60 is part of a transfer member that is mounted for axial sliding movement at the outer periphery of end plate 50 between clutch engaging and non-engaging positions. The position of the clutch being determined by the magnetic force from a plurality of electromagnets 40. A flat spring member 64 returns the transfer ring 60 to its non-engaging position when the electromagnets 40 are de-energized.

Figure 4:
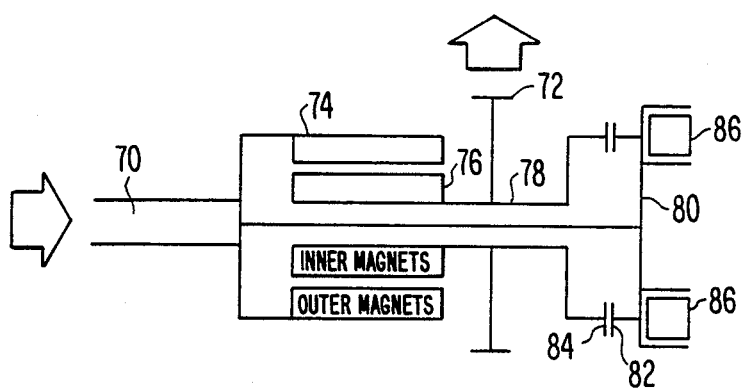
FIG. 4 is a schematic diagram of a second embodiment employing a magnetic coupling.

Referring now to FIG. 4, a further embodiment is illustrated where the input shaft 70 is connected to a coupling that provides output torque at the teeth of a gear 72. Gear 72 is mounted for rotation about an axis that is coaxial with the axis of input shaft 70. The torque to the load taken from gear 72 can be transferred along either of two torque transmission paths.

One transmission path is through a magnetic coupling which is here illustrated to be formed of an outer cylindrical body which is connected to input shaft 70 and an inner cylindrical body 76 which is connected to shaft 78 which, in effect, is the output shaft. Shaft 78 has an axis of rotation that is coextensive with the axis of shaft 70. The outer body 74 may carry one or more magnets that are on its inner periphery and the inner body 76 may carry one or more magnets that are on its outer periphery in facing relation to the magnets on outer body 74. The strength of the magnetic field between the magnets determines the maximum torque that can be transmitted between the input shaft 70 and output gear 72. This maximum torque is also referred to herein as a torque protection threshold.

A second torque transmission path is provided where a torque capacity is required that exceeds the limited torque protection threshold. In FIG. 4, the second path includes plate 80 that carries jaw clutch teeth 82 and which is directly driven by input shaft 70. Mating jaw clutch teeth 84 are carried in a manner to rotate with shaft 78 and with output gear teeth 72. One or the other of the clutch plates carrying teeth 82, 84 is mounted for sliding movement along the direction of the axis of input shaft 70. Energization of the electromagnets 86 causes the clutch teeth 82, 84 to become engaged and lock up the coupling so that the full torque capacity can be used for driving a load.

Figure 5:
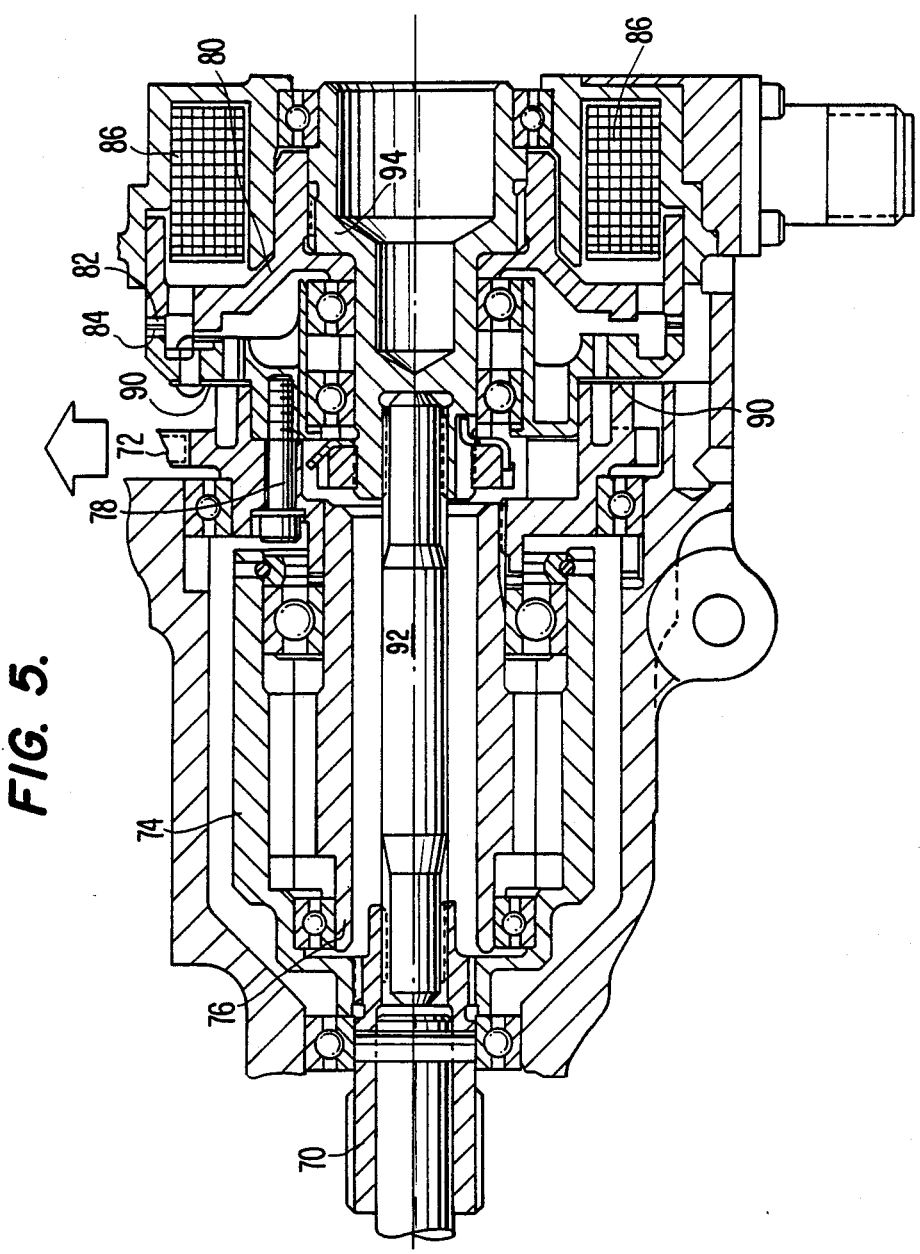
FIG. 5 is an elevation in section of a structure in accordance with the schematic diagram of FIG. 4.

Referring now to FIG. 5, an assembly is shown in which functionally similar parts have been given the same reference numerals as were used in connection with the description of FIG. 4. The input shaft 70 is connected to drive a hollow cylindrical body 74 which has on its inner surface magnets which face the magnets on the outer surface of inner cylindrical body 76. As the outer body 74 rotates, the inner body 76 rotates due to the force of attraction provided by the magnets.

The inner body is spline connected to a transfer member 78 which is mounted for axial sliding movement under the influence of electromagnets 86. The clutch teeth 84 of the electrically operated clutch are thus caused to engage the clutch teeth 82 which in turn are part of plate 80 that is driven by hub 94. Hub 94 is spline connected to the right end of a central shaft 86. The left end of shaft 92 is spline connected to drive shaft 70, thereby providing a direct torque transfer connection between drive shaft 70 and clutch teeth 82.

When the electromagnets 86 are energized, clutch teeth 84 engage clutch teeth 82 to provide the override feature which by-passes the torque protection device provided by the magnetic coupling between body 74 and 76. Clutch teeth 84 return under the influence of spring plate 90 when the electromagnets 86 are deenergized.

While two embodiments have been described, it is evident that many different types of limited torque couplings can be utilized in the system of the present invention. Alternatives to the electromagnets as transfer member shifters are likewise known. Equivalents which fall within the scope of the appended claims are intended to be covered thereby.

I claim:

1. Apparatus for transferring shaft rotation comprising: an input shaft connected to a source of driving torque;
   an output driven shaft for receiving driving torque from said input shaft;
   a pair of torque transmission paths between said input and output shafts;
   one of said paths including a torque limiting clutch connected between said shafts and effective to limit the torque passed from the input shaft to the output shaft, said torque limiting clutch including:
   a driver member and a follower member which are mounted for independent coaxial rotation;
   one of said members having an oval shaped opening;
   the other of said members having a pair of rollers spring biased to diametrically opposed positions relative to the rotational axis of said member;
   said rollers being in engagement with the walls of said oval shaped opening to be normally positioned along a major axis of the oval shaped opening when under a no load condition and to be displaced toward a minor axis of said oval shaped opening as the transmitted torque load is increased;
   the other of said paths including a lock-up clutch, connected between said shafts for providing a torque transfer path which by-passes said torque limiting clutch; and
   means to selectively actuate the lock-up clutch to provide a torque transfer capacity that is unlimited by the torque limiting clutch.

2. Apparatus as defined in claim 1 wherein the lock-up clutch comprises a pair of coaxially mounted gears each having teeth adapted to be engaged but normally spring biased to a non-engaging position, and electrically operated means for moving said gears together in opposition to said spring bias.

3. Apparatus as defined in claim 2 wherein the coaxially mounted gears are coaxial also with the driver and follower members;
   one of said gears is mounted to be rotationally driven by the input shaft and circumferentially surrounds one of said driver and follower members;
   the other of said gears is mounted to be rotationally driven concomitantly with said output shaft and circumferentially surrounds one of said driver and follower members; and
   transfer means associated with a first of said gears for permitting movement of said first gear in a direction of said rotational axis toward a second of said gears in response to actuation of said electrically operated means.

4. Apparatus for transferring shaft rotation comprising:
   an input shaft connected to a source of driving torque;

an output driven shaft for receiving driving torque from said input shaft;

a pair of torque transmission paths between said input and output shafts;

one of said paths including a torque limiting clutch connected between said shafts and effective to limit the torque passed from the input shaft to the output shaft, said torque limiting clutch including:

a pair of cylindrically shaped members mounted for rotation about a common axis;

each pair of said members having magnetic pole portions with the pole portions on one member facing the pole portions on the other member to provide a magnetic coupling between said members;

means connecting one of said members to be driven by the input shaft; and means connecting the other of said members to drive said output shaft;

the other of said paths including a lock-up clutch connected between said shafts for providing a torque transfer path which by-passes said torque limiting clutch; and means to selectively actuate the lock-up clutch to provide a torque transfer capacity that is unlimited by the torque limiting clutch.

5. Apparatus as defined in claim 4 wherein the lock-up clutch comprises:

a pair of coaxially mounted gears each having teeth adapted to be engaged but normally spring biased to a non-engaging position; and wherein said actuating means comprises electrically operated means for moving said gears together in opposition to said spring bias.

6. Apparatus as defined in claim 5 wherein the coaxially mounted gears are coaxial also with the cylindrical members;

one of said gears is mounted to be rotationally driven by one of said members;

the other of said gears is mounted to rotate concomitantly with rotation of the other of said members; and a transfer member associated with a first of said gears for permitting movement of said first gear along said rotational axis toward a second of said gears in response to actuation of said electrically operated means.

7. Apparatus for providing alternatively either a limited or full torque transfer between an input shaft connected to a source of driving torque and an output shaft adapted to receive driving torque from said input shaft comprising:

first and second clutches each having an input torque transmitting member connected to said input shaft and an output torque transmitting member connected to said output shaft;

said first clutch having a structure which is able to transfer no more than a predetermined amount of torque which is less than the full torque that is available and being never disconnected from between the input shaft and the output shaft;

a second clutch being electrically actuated and arranged to transfer the full torque which is available between said input shaft and said output shaft; and means for selectively engaging said second clutch to transfer full torque and by-pass said first clutch while the first clutch remains connected between said input and output shafts.

8. Apparatus as defined in claim 7 wherein the apparatus is bi-directional and both clutches are operative with rotation of the input shaft in either direction of rotation.

9. Apparatus for providing a limited or full torque transfer between an input shaft connected to a source of driving torque and an output shaft adapted to receive driving torque from said input shaft comprising:

first and second clutches each having an input torque transmitting member connected to said input shaft and an output torque transmitting member connected to said output shaft;

said first clutch having a structure which is able to transfer no more than a predetermined amount of torque which is less than the full torque that is available and being never disconnected from between the input shaft and the output shaft;

a second clutch being electromagnetically actuated and arranged to transfer the full torque which is available between said input shaft and said output shaft;

said first clutch being capable of overrun without detrimental thermal of mechanical effects and said second clutch being electrically actuated; and means for selective engaging said second clutch to transfer full torque and by-pass said first clutch while the first clutch remains connected between said input and output shafts.

10. A torque protection system for a motor connected to drive a load through a coupling assembly, said coupling assembly comprising:

first and second clutch mechanisms with each clutch mechanism having a input members connected together and output members connected together;

one of said clutch mechanisms having a capability of transferring no more than a predetermined amount of torque which is less than the full torque that is available and of resetting after being electrically actuated and overtorqued without manual intervention;

the other of said clutch mechanisms being arranged to transfer a larger torque than said predetermined amount; and means for selectively actuating said second clutch mechanism while said first clutch mechanism remains engaged at all times.

11. The system as defined in claim 10 wherein the direction of shaft rotation of the motor is reversible and both clutch mechanisms are operative with shaft rotation in either direction.

12. A torque protection system for a motor connected to drive a load through a coupling assembly, said coupling assembly comprising:

first and second clutch mechanisms with each clutch mechanism having input members connected together and output members connected together;

one of said clutch mechanisms having a capability of transferring no more than a predetermined amount of torque which is less than the full torque that is available and of resetting after being overtorqued without manual intervention, said one clutch mechanism being capable of overrun without detrimental thermal or mechanical effects and includes one clutch mechanism is capable of overrun without detrimental thermal or mechanical effects;

the other of said clutch mechanisms being electrically actuated and arranged to transfer a larger torque than said predetermined amount;

means for selectively actuating said second clutch mechanism while said first clutch mechanism remains engaged at all times.

13. The system as defined in claim 12 wherein said one clutch mechanism is a spring loaded roller-cam clutch.

14. A torque protection system for a motor connected to drive a load through a coupling assembly, said coupling assembly comprising:

first and second clutch mechanisms with each clutch mechanism having input members connected together and output members connected together;

one of said clutch mechanisms having a capability of transferring no more than a predetermined amount of torque which is less than the full torque that is available and of resetting after being overtorqued without manual intervention, said one clutch mechanism being capable of overrun without detrimental thermal or mechanical effects and includes a pair of spaced members having facing surfaces with said facing surfaces each carrying permanent magnets to provide a magnetic coupling clutch;

the other of said clutch mechanism being electrically actuated and arranged to transfer a larger torque than said predetermined amount;

means for selectively actuating said second clutch mechanism while said first clutch mechanism remains engaged at all times.

15. A torque protection system for a motor is connected to drive a load through a coupling assembly, said coupling assembly comprising:

first and second clutch mechanism with each clutch mechanism having input members connected together and output members connected to drive a plurality of loads through different ones of said clutch mechanisms;

one of said clutch mechanisms having a capability of transferring no more than a predetermined amount of torque which is less than the full torque that is available and of resetting after being over-torqued without manual intervention;

the other of said clutch mechanisms being arranged to transfer a larger torque than said predetermined amount; and means for selectively actuating said second clutch mechanism while said first clutch mechanism remains engaged at all times.

* * * * *